United States Patent [19]

Bronicki et al.

[11] Patent Number: 5,671,601
[45] Date of Patent: Sep. 30, 1997

[54] GEOTHERMAL POWER PLANT OPERATING ON HIGH PRESSURE GEOTHERMAL FLUID

[75] Inventors: Lucien Y. Bronicki, Yavne, Israel; Gilbert Riollet, Paris, France; Nadav Amir, Rehovot, Israel; Moshe Grassianni, Herzlyia, Israel; Asher Elovic, Macabeem, Israel; Yoel Gilon, Jerusalem, Israel; Alex Moritz, Holon, Israel

[73] Assignee: Ormat Industries, Ltd., Yavne, Israel

[21] Appl. No.: 329,781

[22] Filed: Oct. 27, 1994

Related U.S. Application Data

[63] Continuation of Ser. No. 124,792, Sep. 22, 1993, abandoned, which is a continuation of Ser. No. 955,686, Oct. 2, 1992, abandoned.

[51] Int. Cl.$^6$ ............................................. F03G 7/00
[52] U.S. Cl. .......................... 60/641.5; 60/641.2; 60/653; 60/679
[58] Field of Search .................. 60/641.2, 641.5, 60/649, 653, 676, 677, 679, 683

[56] References Cited

U.S. PATENT DOCUMENTS

| | | | |
|---|---|---|---|
| 3,862,545 | 1/1975 | Ellis et al. | 60/641.5 |
| 4,189,923 | 2/1980 | Berg | 60/641.5 |
| 4,428,200 | 1/1984 | McCabe et al. | 60/641.5 |
| 4,953,356 | 9/1990 | Soo-Hoo et al. | 60/641.5 |

FOREIGN PATENT DOCUMENTS 192050  4/1983  New Zealand.

OTHER PUBLICATIONS

Letter from New Zealand Patent Office dated Aug. 19, 1994.

*Primary Examiner*—Stephen F. Husar
*Attorney, Agent, or Firm*—Donald M. Sandler

[57] ABSTRACT

Power is produced from high presser geothermal fluid by separating the fluid into high pressure steam and high pressure brine, expanding the high pressure steam in a high pressure turbogenerator for producing power and heat depleted steam, and separating liquid from the heat depleted steam thereby producing dried heat depleted steam at a pressure and temperature lower than the pressure and temperature of the high pressure steam. The liquid so separated, and the high pressure brine are combined in a flash chamber which produces steam which is combined with the dried heat depleted steam and expanded in a lower pressure turbogenerator for producing additional power. Optionally, some of the high pressure steam is used to reheat the dried heat depleted steam and the steam produced by the flash chamber before such steam is expanded in the lower pressure turbogenerator.

37 Claims, 4 Drawing Sheets

GEOTHERMAL POWER PLANT OPERATING ON HIGH PRESSURE GEOTHERMAL FLUID

RELATED APPLICATION

This application is a continuation of application No. 08/124,792, filed Sep. 22, 1993, now abandoned, which is a continuation of application No. 07/955,686 filed Oct. 2, 1992, now abandoned.

TECHNICAL FIELD

This invention relates to a geothermal power plant operating on high pressure geothermal fluid.

BACKGROUND OF THE INVENTION

The need for alternatives to fossil fuels for power production is well known; and geothermal resources represent a promising solution. However, in order to be economically attractive, a geothermal source must be utilized in a way that maximizes power extraction within the bounds of good engineering practice. This requires maximum conversion of both latent and sensible heat present in the geothermal fluid, and the selection of a thermodynamic cycle with maximum efficiency. Such a cycle should minimize scaling and corrosive effects of geothermal fluids on the materials of the power plant. Finally, ecological considerations require the return of all extracted fluids, liquids and gases, to the ground in order to avoid environmental impact, and to inhibit resource depletion.

Many geothermal sources currently under investigation or exploitation produce large quantities of hot brine at moderate pressures, typically about 150 psia. Some sources, however, produce fluid mixtures of steam and brine at much higher pressures, for example, 800 psia. In the latter case, the brine is usually very corrosive giving rise to problems in using and disposing of the brine. Recently, geothermal wells in Hawaii have been drilled producing high pressure fluid that is about 80% steam and 20% brine. The steam is usually only saturated, and there is some question as to whether these wells will maintain the 800 psia pressure in the face of continuous use over the years.

To take this uncertainty to account, it has been conventional to install pressure reducing valves into the flow from the well so that a low pressure steam system can be used in the expectation that the high pressure eventually will fall. However, this is a conservative design, and it is costly because over the life of the plant, because a considerable amount of potential power will have been lost.

A back pressure steam turbine driving a generator would seem to be an alternative approach in that the high pressure steam from the well could be converted to lower pressure steam by the turbine and applied in parallel to a plurality of modules that can operate on low pressure steam. Each module may utilize a low pressure steam turbogenerator, and a condenser that acts as a vaporizer for an organic vapor turbo-generator. When the geothermal fluid produces only high pressure, saturated steam, expansion of the steam in a turbine takes place in the wet region of the temperature-entropy diagram, producing exhaust steam that contains water droplets and is thus not suitable for application to the inlet stages of low pressure steam turbines in the various modules.

It is therefore an object of the present invention to provide a new and improved geothermal power plant capable of operating on high pressure geothermal fluid without the attendant disadvantages of the prior art described above.

BRIEF DESCRIPTION OF THE INVENTION

According to the present invention, power is produced from high presser geothermal fluid by separating the fluid into high pressure steam and high pressure brine, expanding the high pressure steam in a high pressure turbogenerator for producing power and heat depleted steam, and separating liquid from the heat depleted steam thereby producing dried heat depleted steam at a pressure and temperature lower than the pressure and temperature of the high pressure steam. The liquid so separated, and the high pressure brine are combined in a flash chamber which produces steam which is combined with the dried heat depleted steam and expanded in a lower pressure turbogenerator for producing additional power. Optionally, some of the high pressure steam is used to reheat the dried heat depleted steam and the steam produced by the flash chamber before such steam is expanded in the lower pressure turbogenerator.

In a modification, the high pressure geothermal fluid is applied to an indirect heat exchanger, or preferably a number of heat exchangers, which serve as vaporizer and preheater for a closed steam system in which steam is expanded in a high pressure stage of a turbogenerator to generate power and heat depleted steam. A moisture separator separates liquid from the heat depleted steam producing dried heat depleted steam. The separated liquid is applied to a flash chamber which also receives preheated water from the preheater, and which produces steam that is combined with the dried heat depleted steam and applied to a lower pressure turbogenerator.

BRIEF DESCRIPTION OF THE DRAWINGS

Embodiments of the present invention are shown by way of example in the accompanying drawings wherein.

DETAILED DESCRIPTION

Figure 1:
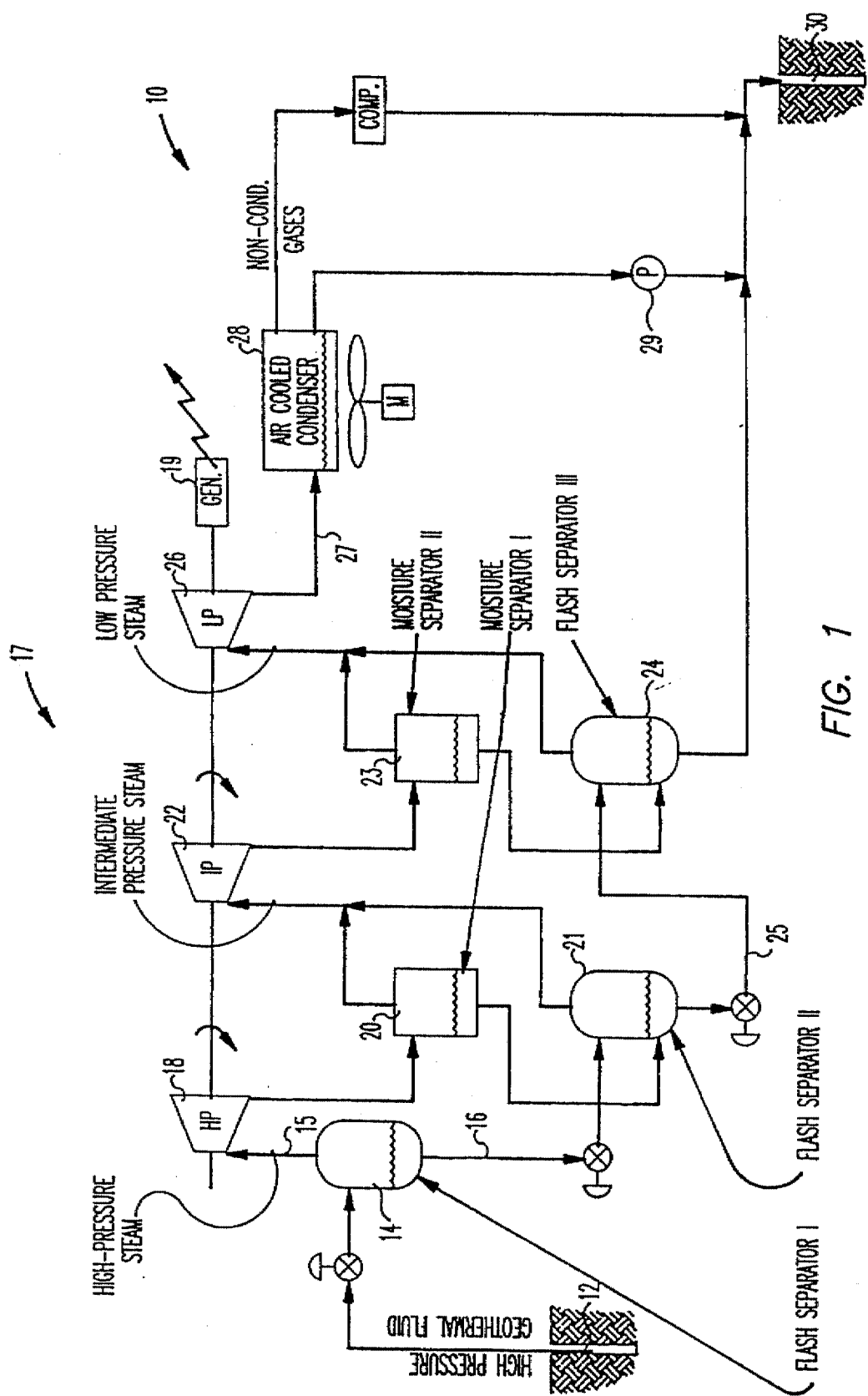
FIG. 1 is a block diagram of a first embodiment of the invention to accomplish maximal power extraction from a high pressure geothermal source directly using the geothermal fluid produced by the source.

Referring now to the drawing, reference numeral 10 designates one embodiment of a geothermal power plant according to the present invention operating on high pressure geothermal fluid. The geothermal fluid is supplied from production well 12 and typically produces geothermal fluid at about 800 psia comprising a mixture of about 80% saturated steam and 20% concentrated brine. The composite fluid produced by well 12 is supplied to first flash chamber 14 which separates the fluid into two channels, a channel containing high pressure steam indicated by reference numeral 15 and a channel containing high pressure brine indicated by reference numeral 16. The high pressure saturated steam in channel 15 is applied to high pressure stage 18 of steam turbine 17 which is directly coupled to generator 19 such that the expansion of the high pressure steam in turbine stage 18 drives generator 19 which produces electricity supplied to an electrical grid (not shown).

Turbine stage 18 exhausts heat depleted high pressure steam into moisture separator 20 wherein water in the exhaust steam is separated from the steam producing dried steam at an intermediate pressure pressure. The water from the moisture separator drains into the sump of second flash chamber 21 which is connected to line 16 of first separator 14 allowing the liquid therein to flash into steam at a temperature and pressure consistent with the temperature and pressure of the dried steam produced by moisture separator 20. The steam produced by chamber 21 is combined with the steam produced by separator 20 and applied to intermediate pressure stage 22 of turbogenerator 17. The steam applied to stage 22 expands driving generator 19 and producing heat depleted steam at the exhaust of stage 22.

Turbogenerator 17 includes a low pressure stage that operates in the same manner that intermediate stage 22 operates. That is to say, the steam exhausted from stage 22 is applied to moisture separator 23 wherein water in the exhaust steam is separated from the steam producing dried steam at a lower pressure. The water from the moisture separator drains into the sump of third flash chamber 24 which is connected to line 25 itself connected to the sump of second chamber 21 allowing the brine therein to flash into steam at a temperature and pressure consistent with the temperature and pressure of the dried steam produced by moisture separator 23. The steam produced by chamber 24 is combined with the steam produced by separator 23 and applied to low pressure stage 26 of turbogenerator 17. The steam applied to stage 26 expands driving generator 19 and producing heat depleted steam in line 27 at the exhaust of stage 26.

Line 27 is connected to condenser 28, shown as an air-cooled device, which condenses the exhaust steam producing condensate that is pressurized by pump 29 into rejection well 30. This rejection well also receives concentrated brine in the sump of flash separator 24, as well as non-condensable gases extracted from condenser 28 which are pressurized before being applied to the well.

The provision of moisture separators 20 and 21 between the stages of the turbogenerator maintains the wetness of the steam at the inlet to each stage at acceptable levels and results in more efficient turbine performance. Furthermore, the flashing of water between stages permits maximal cooling of the working fluid (water) allowing maximum extraction of sensible heat. In addition, the application of condensate from the moisture separators to the flash chambers serves to dilute the brine in the sumps of these separators, reducing the concentration and preventing precipitation as the brine cools. This also effects optimal lower temperatures for flashing. Without the addition of brine, such low temperatures could not be achieved.

Figure 2:
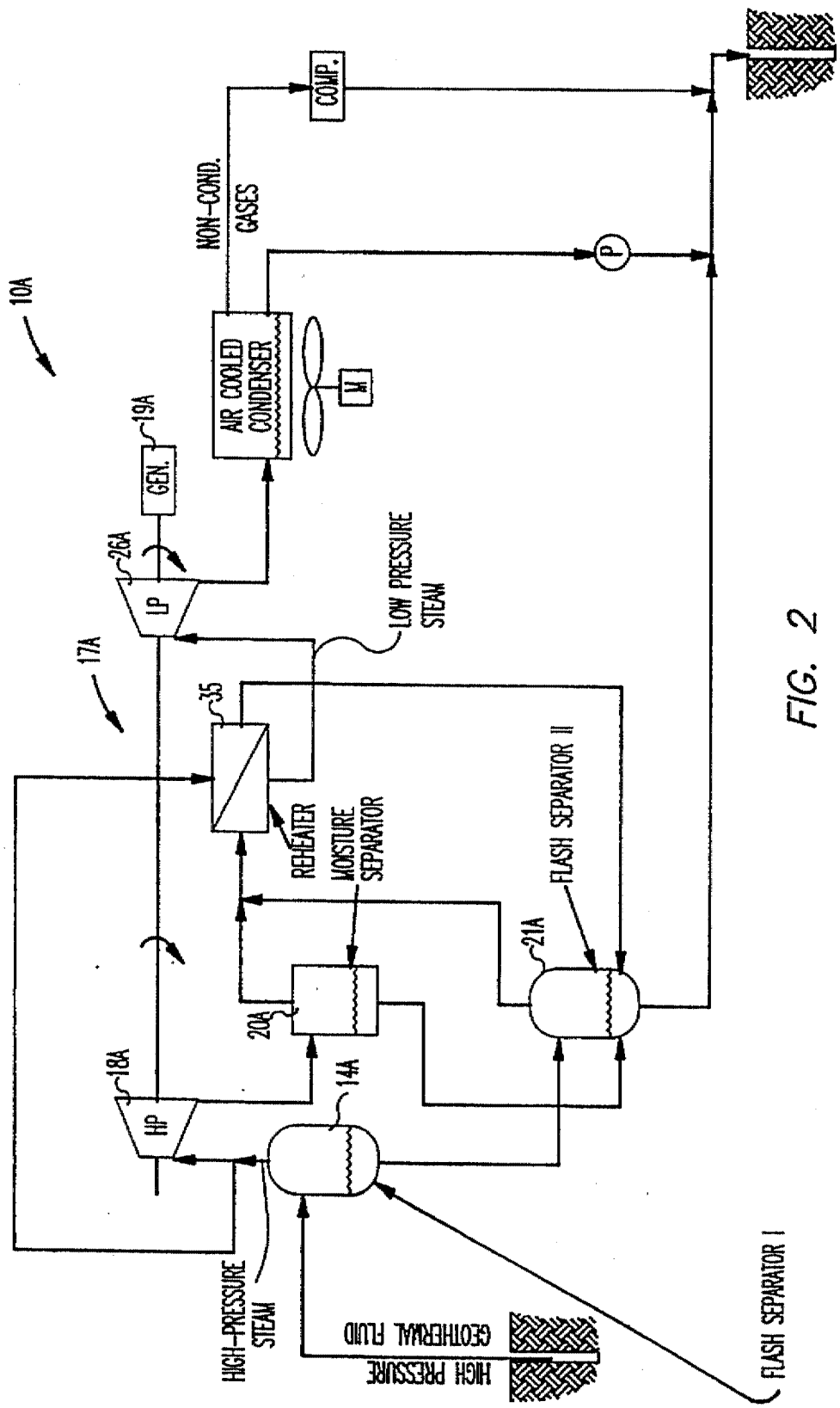
FIG. 2 is a block diagram of a modification of the embodiment shown in FIG. 1 but utilizing a reheater.

The modification of the invention shown in FIG. 2 provides for reheating of the steam between stages. As shown in embodiment 10A, some of the high pressure steam produced by first flash separator shunts high pressure stage 18A and is applied to reheater 35 wherein the steam gives up both latent and sensible heat before being applied to the sump of second flash separator 21A.

After the high pressure steam expands stage 18A and drives generator 19A, the heat depleted high pressure steam exhaust into moisture separator 20A wherein water is extracted from the steam producing dried lower pressure steam that is combined with steam flashed in chamber 21A which is supplied with brine from the sump of flash separator 14A. Instead of this steam being supplied to low pressure stage 26A, the steam is first reheated in reheater 35 as the high pressure steam is cooled in the reheater.

Figure 3:
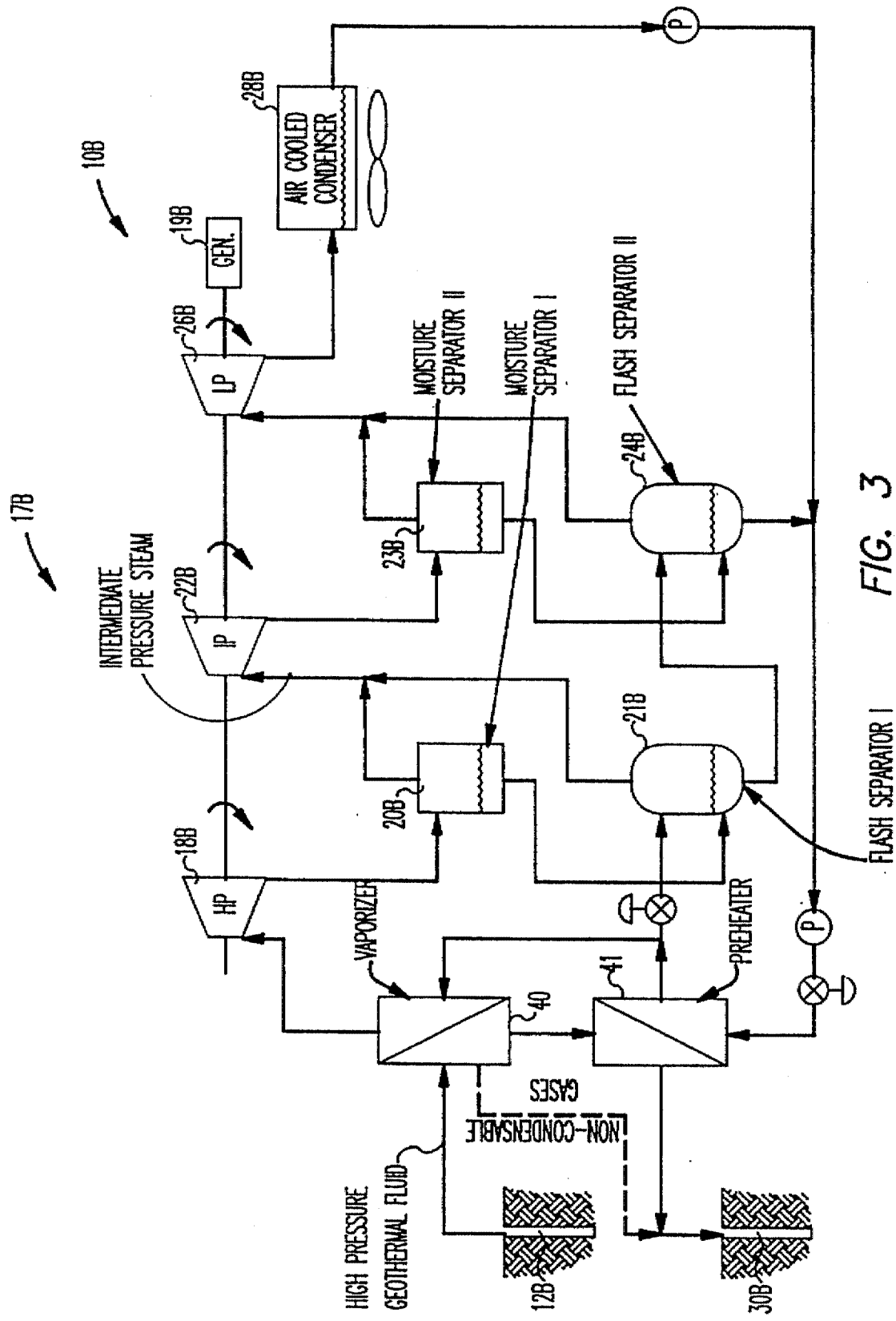
FIG. 3 is a block diagram of a second embodiment of the present invention similar to the first embodiment, but indirectly utilizing the geothermal fluid.

In embodiment 10B of FIG. 3, a closed cycle steam plant is illustrated in which the high pressure geothermal fluid is in indirect contact with the working fluid (water). As shown, high pressure geothermal fluid from production well 12B is applied to indirect heat exchanger 40 that functions as a vaporizer for preheated water supplied thereto. After vaporizing the water in the heat exchanger, the cooled geothermal fluid flows into heat exchanger 41 that functions as a preheater for condensate supplied thereto. The further cooled geothermal fluid, which is mostly liquid, is then returned to rejection well 30B. Because the pressure of the geothermal fluid is maintained at a relatively high level, precipitation of minerals from the fluid will be minimized, and no additional pressurization is necessary for injection into the ground.

If the amount of non-condensable gases, including hydrogen sulfide, in the geothermal fluid is so great that heat transfer in vaporizer 40 is adversely affected, these gases can be extracted from the vaporizer and combined with the cooled liquid geothermal fluid that exits preheater 41 before the mixture is delivered to rejection well 30B. This procedure is facilitated because the increased solubility of the non-condensable gases in the cooled liquid geothermal fluid that exits the preheater. In addition, the high pressure of the non-condensable gases in the vaporizer facilitates extraction with a minimum of entrained geothermal steam.

Steam generated in vaporizer 40 is applied to high pressure stage 18B of turbogenerator 17B wherein expansion takes place driving generator 19B connected to an electrical grid (not shown). The steam exhausted from stage 18B is applied to moisture separator 20B which separates the wet steam into a liquid component and a dry steam component at an intermediate pressure. The liquid component from this separator drains into the sump of flash chamber 21B to which preheated water from preheater 41 is supplied. The water in flash chamber 21B is flashed into steam at a temperature and pressure comparable to the temperature and pressure of the steam produced by separator 20B. The steam produced by chamber 21B and separator 20B is combined and supplied to intermediate stage 22B of turbogenerator 17B wherein expansion takes place driving generator 19B.

The steam exhausted from stage 22B is supplied to moisture separator 23B which separates the wet steam into a liquid component and a dry steam component at a low pressure. The liquid component from this separator is supplied to the sump of flash chamber 24B to which water from the sump of chamber 21B is supplied. The water from chamber 24B is flashed into steam at a temperature and pressure comparable to the temperature and pressure of the steam produced by separator 23B. The steam produced by separator 23B and chamber 24B is combined and supplied to low pressure stage 26B of turbogenerator 17B wherein expansion takes place driving generator 19B.

Steam exhausted from stage 26B is condensed in air-cooled condenser 28B, and the condensate is pressurized to the pressure of the liquid in the sump of chamber 24B, combined with this liquid, and then returned to preheater 41. After being preheated, some of the water that exits preheater 41 is applied to chamber 21B, but the bulk of the water is supplied to vaporizer 40 to produce high pressure steam for turbine stage 18B. The distribution of water from the preheater, as between the vaporizer and chamber 21B is such that only enough water is supplied to the separator as necessary to produce steam comparable to the steam produced by separator 20B.

Preferably, the flow rate of water in preheater 41 is comparable to the flow rate of the geothermal fluid, which is mostly liquid, in the preheater. This enhances the extraction of heat from the geothermal fluid. Fluctuations in the flow rate of the geothermal fluid, in the dry bulb temperature of ambient air which affects operation of the air cooled condenser, or in other parameters that affect the heat source and heat sink of the power plant, can be accommodated by controlling the flow rate of water into preheater 41. The amount of water supplied to preheater 41 in excess of that needed to balance the flow rate of the geothermal fluid in the preheater can be diverted to flash chamber 21B. This provides a convenient way to control and stabilize the operation of the power plant. In embodiment 10C of FIG. 4, a closed cycle steam plant is illustrated in which the high pressure geothermal fluid is in indirect contact with the working fluid (water), and reheating is carried out. As shown, high pressure geothermal fluid from production well 12C is applied to indirect heat exchanger 50 that functions as a vaporizer for preheated water supplied thereto. After vaporizing the water in the heat exchanger, the cooled geothermal fluid flows into heat exchanger 51 that functions as a reheater for interstage reheating of the working fluid (water) supplied thereto. The further cooled geothermal fluid is then applied to heat exchanger 52 which functions as a preheater for the working fluid (water), and is then returned to rejection well 30C. Because the pressure of the geothermal fluid is maintained at a relatively high level, little precipitation of minerals in the fluid will occur, and no additional pressurization is necessary for injection into the ground.

Steam generated in vaporizer 50 is applied to high pressure stage 18C of turbogenerator 17C wherein expansion takes place driving generator 19C connected to an electrical grid (not shown). The steam exhausted from stage 18C is applied to moisture separator 20C which separates the wet steam into a liquid component and a dry steam component at an intermediate pressure. The liquid component of this separator drains into the sump of flash chamber 21C to which preheated water from preheater 52 is supplied. The water in chamber 21C is flashed into steam which is combined with the steam produced by separator 20C and supplied to reheater 51. After being heated, the steam is supplied to the inlet of stage 22c of turbogenerator 17C where expansion takes place driving generator 19C.

The steam exhausted from stage 22C is condensed in air-cooled condenser 28C, and the condensate is pressurized to the pressure of the liquid in the sump of separator 21C, combined with this liquid, and then returned to preheater 52. After being preheated, the water that exits preheater 52 is applied to separator 21C.

Figure 4:
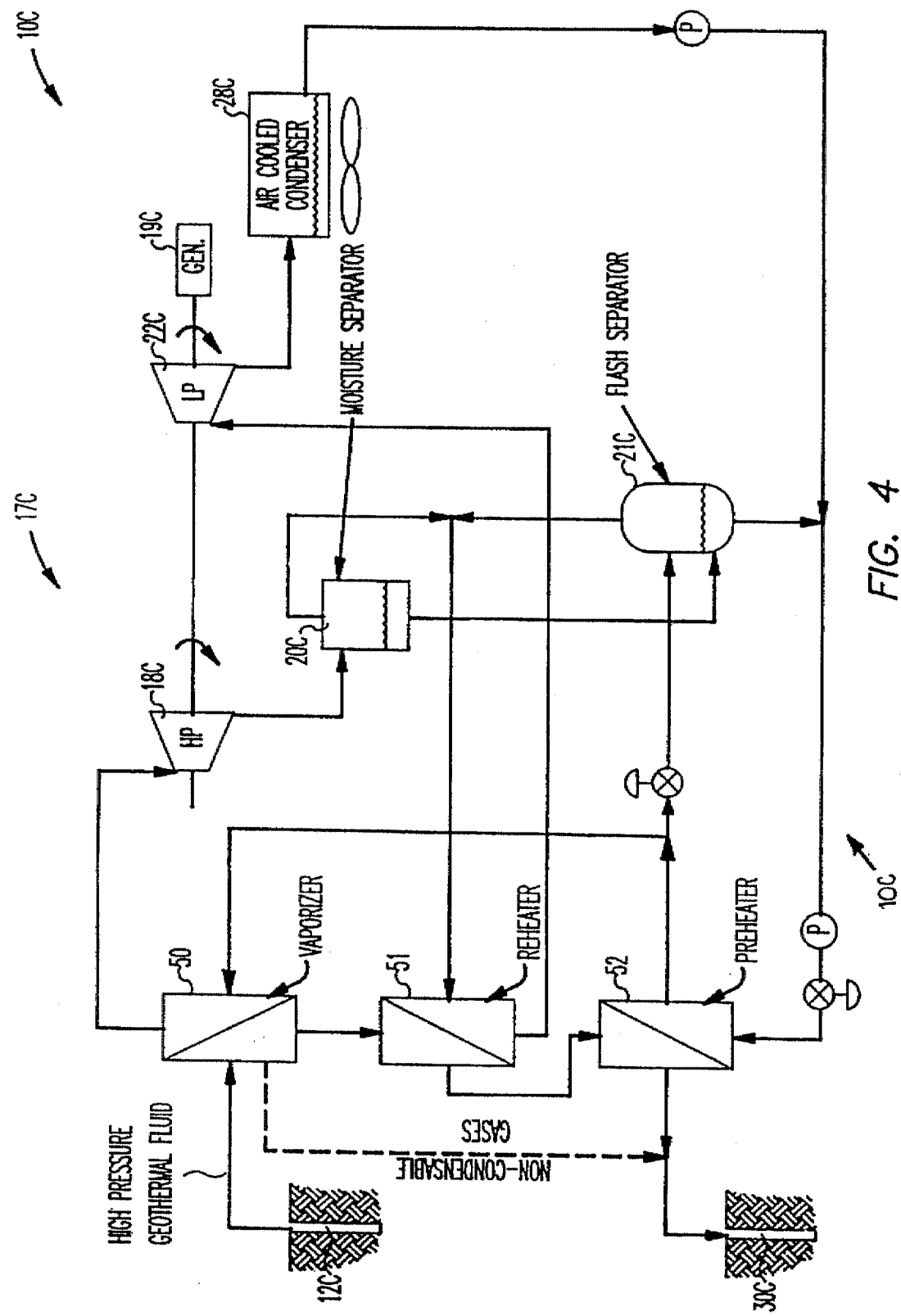
FIG. 4 is a block diagram of a modification of the embodiment shown in FIG. 3.

While the embodiments of FIGS. 2 and 4 show a two stage turbogenerator, the invention is applicable to turbogenerators with more stages. Also, while a single generator is shown being driven by all of the turbine stages, separate generators can be provide for each stage. In addition, while the condensers shown in the various embodiments are shown as air-cooled, water-cooled condensers can also be used in the present invention.

Finally, although not shown, organic fluid Rankine cycle turbines, preferably using pentane or isopentane in accordance with ambient conditions, can be operated in conjunction with the lower pressure steam turbines. In such case, the condenser for the steam turbine would be cooled with an organic fluid. Although single stage turbines are described above, parallel stages or turbines may be used if convenient.

In the embodiments of FIGS. 1 and 3, three turbine stages are described, and this is convenient when the geothermal fluid has a relatively high pressure, e.g., 800 psia. In such case, the steam applied to the intermediate pressure stage may be about 100–150 psia, and the steam applied to the low pressure stage may be from 20–40 psia. When the pressure of the geothermal fluid form the production well is lower, only the intermediate and lower pressure stages can be used.

Fossil fuel heaters can be used for superheating, drying the steam, or for other purposes thus increasing the efficiency and feasibility of the present invention under various conditions. Most of the advantages referred to in connection with the embodiment of FIG. 1 are also applicable to the other embodiments of the invention shown in the other figures.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for producing power from geothermal fluid comprising the steps of:
   (a) producing steam using said geothermal fluid;
   (b) providing a high pressure steam turbine for producing power from steam produced from said geothermal fluid;
   (c) separating moisture from heat depleted steam exiting said steam turbine for producing dried heat depleted steam and liquid;
   (d) draining said liquid into a chamber for collecting said liquid;
   (e) supplying further liquid to said chamber, the temperature of the further liquid being higher than the temperature of liquid draining into said chamber; and
   (f) flashing liquid in said chamber for producing steam and supplying it together with said dried heat depleted steam to the inlet of a further steam turbine for producing power and further heat depleted steam.

2. A method according to claim 1 further comprising the step of reheating said steam produced by flashing said liquid in said chamber before the reheated steam is applied to said further turbine.

3. A method according to claim 1 further comprising the steps of separating moisture from said further heat depleted steam for drying said further heat depleted steam, and supplying the dried further heat depleted steam to an additional steam turbine.

4. A method according to claim 3 further comprising the steps of draining moisture separated from said further heat depleted steam into a further chamber supplied with liquid from said chamber for producing further liquid and flashing said further liquid for producing further steam which is supplied together with the dried further heat depleted steam to said additional steam turbine.

5. A method according to claim 4 further comprising the step of supplying said further liquid from said further chamber to a still further chamber for flashing it and producing still further steam which is supplied to an intermediate stage of said additional steam turbine.

6. A method according to claim 1 wherein the step of producing steam using said geothermal fluid is carried out by separating steam from said geothermal fluid.

7. A method according to claim 1 wherein the step of producing steam using said geothermal fluid is carried out by using heat contained in said geothermal fluid for vaporizing water to produce said steam and heat depleted geothermal liquid.

8. A method according to claim 7 further comprising the step of preheating said water with said heat depleted geothermal liquid.

9. Apparatus for producing power from high pressure geothermal fluid comprising:
   (a) means for producing steam using said geothermal fluid;
   (b) a primary steam turbine for producing power from steam produced from said geothermal fluid;
   (c) a moisture separator for separating moisture from heat depleted steam exiting said primary steam turbine and producing dried heat depleted steam and liquid;
   (d) a chamber that collects liquid produced in said moisture separator and flashes liquid in said chamber to produce steam; and
   (e) means for supplying said steam produced in said chamber together with said dried heat depleted steam to the inlet of a further steam turbine for producing power and further heat depleted steam.

10. Apparatus according to claim 9 further comprising a reheater interposed between said means for supplying said steam and said further steam turbine for reheating said steam produced by flashing said liquid.

11. Apparatus according to claim 9 further comprising a further moisture separator for separating moisture from said further heat depleted steam to produce dried further heat depleted steam and separated liquid, and means for supplying said further heat depleted steam to an additional steam turbine.

12. Apparatus according to claim 11 further comprising a further chamber supplied with liquid from said chamber and for collecting said separated liquid draining from said further moisture separator and producing further liquid and for flashing said further liquid to producing further steam which is supplied together with dried further heat depleted steam to said additional steam turbine.

13. Apparatus according to claim 12 further comprising a still further chamber for receiving said further liquid from said further chamber and for flashing it and producing still further steam which is supplied to an intermediate stage of said additional steam turbine.

14. Apparatus according to claim 9 wherein said means for producing steam using said geothermal fluid includes a separator for separating steam from said geothermal fluid.

15. Apparatus according to claim 14 wherein said separator further produces geothermal liquid.

16. Apparatus according to claim 15 wherein said geothermal liquid is supplied to said chamber.

17. Apparatus according to claim 9 wherein said means for producing steam using said geothermal fluid includes a vaporizer for extracting heat contained in said geothermal fluid and vaporizing water to produce said steam and heat depleted geothermal liquid.

18. Apparatus according to claim 17 further comprising a preheater for preheating said water with said heat depleted geothermal liquid.

19. Apparatus according to claim 18 wherein the flow rate of water in said preheater is comparable to the flow rate of said heat depleted geothermal liquid in said preheater.

20. Apparatus according to claim 18 further comprising a control valve for controlling the flow rate of water in said preheater.

21. Apparatus according to claim 17 wherein said geothermal fluid contains non condensable gases.

22. Apparatus according to claim 21 further comprising the step of injecting said heat depleted geothermal fluid including said non condensable gases into a reinjection well.

23. Apparatus according to claim 9 including means for heating the liquid in said chamber which is collected from said moisture separator.

24. Apparatus according to claim 23 wherein said means for heating the liquid includes supply means for supplying further liquid to said chamber, the temperature of said further liquid being higher than the temperature of liquid produced in said moisture separator.

25. A method for producing power from high pressure geothermal fluid comprising:
   a) producing high pressure steam using said geothermal fluid;
   b) expanding the high pressure steam in a high pressure turbogenerator for producing power and heat depleted steam;
   c) separating liquid from the heat depleted steam thereby producing dried heat depleted steam at a pressure and temperature lower than the pressure and temperature of the high pressure steam;
   d) combining the liquid so separated with heated water to form a mixture;
   e) flashing the mixture for producing flashed steam; and
   f) expanding said flashed steam and said dried heat depleted steam in a lower pressure turbogenerator for producing additional power.

26. A method according to claim 25 wherein some of the high pressure steam is used to reheat the dried heat depleted steam and the flashed steam before expansion in the lower pressure turbogenerator.

27. A method according to claim 25 wherein said high pressure steam is produced by separating the high pressure geothermal fluid into high pressure steam and high pressure brine, and wherein said heated water is part of said high pressure brine.

28. A method according to claim 25 wherein said high pressure steam is produced by indirectly contacting water with said high pressure geothermal fluid.

29. Apparatus for producing power from pressure geothermal fluid comprising:
   (a) means for producing steam using said geothermal fluid;
   (b) a steam turbine responsive to said steam for producing power and wet, expanded steam;
   (c) a separator for separating said wet, expanded steam into dry expanded steam and separated water;
   (d) means for applying said dry expanded steam to a further steam turbine; and
   (e) means for converting heat in said separated water into power.

30. A method for producing power from geothermal fluid comprising:
   a) producing steam using said geothermal fluid;
   b) expanding said steam in a turbogenerator for producing power and heat depleted steam;
   c) adding heat to said heat depleted steam to form heated, heat depleted steam; and
   d) expanding said heated heat depleted steam in a turbogenerator for producing power.

31. A method according to claim 30 wherein said steam is derived by separating said geothermal fluid into a vapor and a liquid component.

32. A method according to claim 30 wherein said steam is derived by indirectly heating water with said geothermal fluid.

33. A method for producing power from geothermal fluid comprising the steps:

(a) producing steam using said geothermal fluid;

(b) applying said steam to a steam turbine for producing power and heat depleted steam;

(c) reheating said heat depleted steam for producing reheated heat depleted steam;

(d) supplying said reheated heat depleted steam to the inlet of a further steam turbine for producing power and further heat depleted steam.

34. A method according to claim 33 wherein the step of producing steam is effected by separating said geothermal fluid into steam and brine.

35. A method according to claim 34 wherein the step of reheating the heat depleted steam is effected using steam separated from said geothermal fluid.

36. A method according to claim 33 wherein the step of producing steam is effected by using heat contained in said geothermal fluid for vaporizing water and producing cooled geothermal fluid.

37. A method according to claim 36 wherein the step of reheating the heat depleted steam is effected using steam said cooled geothermal fluid.

* * * * *